United States Patent
Chrisco et al.

(10) Patent No.: US 6,523,499 B1
(45) Date of Patent: Feb. 25, 2003

(54) PET CARRIER

(75) Inventors: Larry L. Chrisco, Fairland, OK (US); Charles L. Forbis, Quapaw, OK (US)

(73) Assignee: Blitz U.S.A., Inc., Miami, OK (US)

( * ) Notice: Subject to any disclaimer, the term of this patent is extended or adjusted under 35 U.S.C. 154(b) by 61 days.

(21) Appl. No.: 09/640,229

(22) Filed: Aug. 16, 2000

(51) Int. Cl.[7] ............................................... A01K 1/00
(52) U.S. Cl. ........................................................ 119/496
(58) Field of Search ................................. 119/452, 453, 119/473, 474, 479, 482, 480, 497, 496, 499, 498, 771, 751, 722; 190/100, 106, 107, 109, 110, 115, 117

(56) References Cited

U.S. PATENT DOCUMENTS

| | | | |
|---|---|---|---|
| 2,470,223 A | * 5/1949 | Powells | |
| 3,791,347 A | * 2/1974 | Lovell | |
| 5,503,107 A | * 4/1996 | Satcher et al. | 119/19 |
| 5,678,509 A | * 10/1997 | Dillon | 119/496 |
| 5,791,292 A | * 8/1998 | Jempolsky | 119/497 |
| 6,223,691 B1 | * 5/2001 | Beattie | 119/453 |

* cited by examiner

Primary Examiner—Thomas Price
(74) Attorney, Agent, or Firm—Hovey Williams LLP

(57) ABSTRACT

A highly styled pet carrier having a housing defined by a body which body has upper and lower portions attached together through mating trackways with the line of attachment being inclined upwardly from the front of the body to the rear of the body to present an aesthetically pleasing, functional article. The pet carrier has a front door, in one embodiment, which is swung upwardly and horizontally inwardly so that it is retained within the interior of the housing unopened. In a further embodiment a recess in the top wall of the upper portion of the body may serve as a storage compartment with a swingable closure door or, in the alternative, as an access opening into the interior of the housing, the access opening being closed by a swingable closure grille. A pulling handle on the top wall of the upper portion of the housing cooperates with wheels on the bottom wall of the lower portion of the housing to prevent the pet carrier to be pulled over a surface or, in the alternative, a carrying handle may be provided on the top wall of the upper portion of the body which defines the housing.

16 Claims, 4 Drawing Sheets

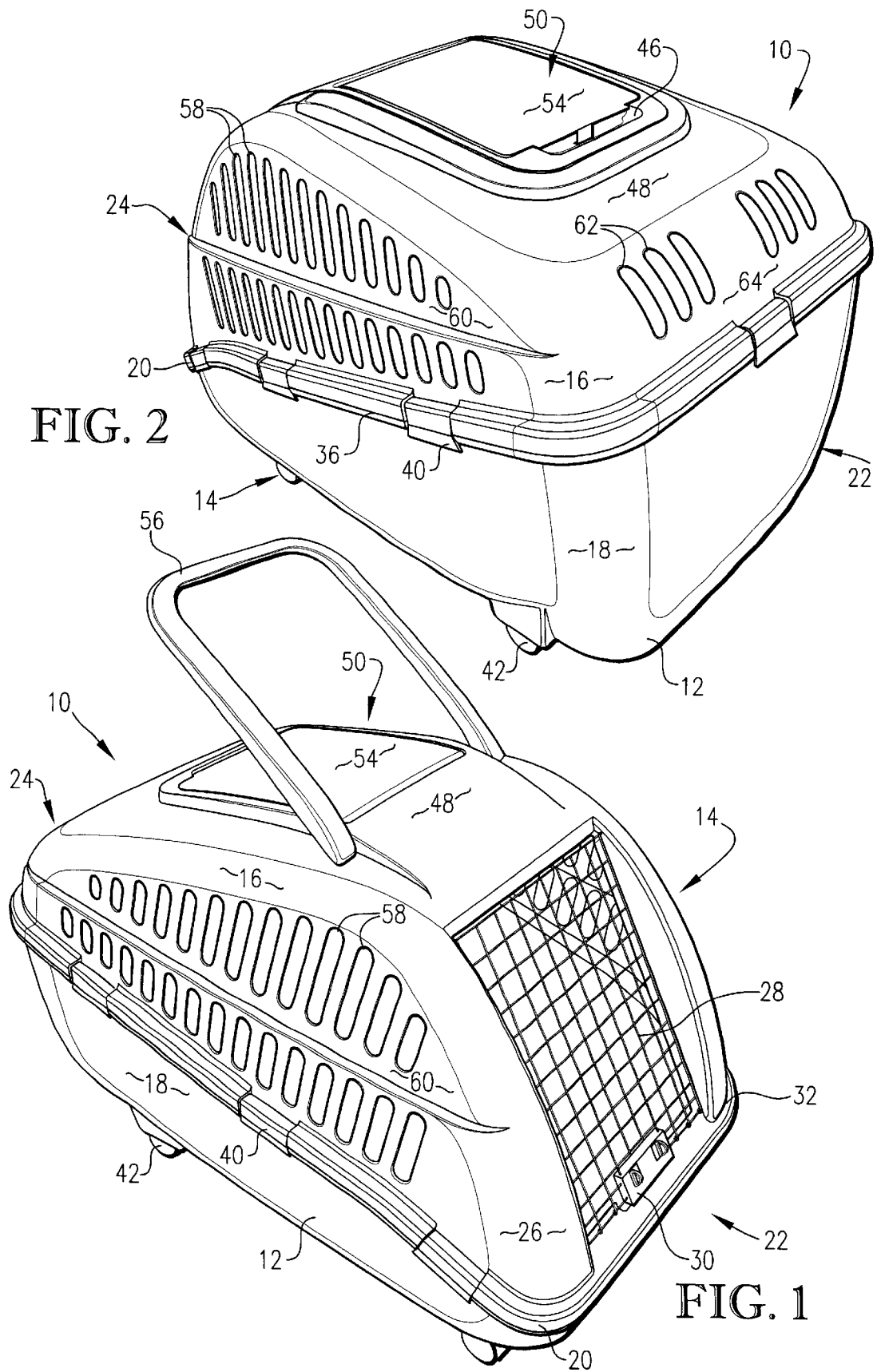

PET CARRIER

BACKGROUND OF THE INVENTION

1. Field of the Invention

The invention is directed toward an improved pet carrier of the type utilized for transporting small animals, particularly dogs and cats, between two points in private vehicles and also in public transportation vehicles such as airplanes, railroads and similar modes of transportation. The pet carrier has a housing body comprised of an upper and a lower portion there being wheels on the body whereby, through use of a pull handle, swingably attached to the upper portion of the body, the pet carrier may be readily moved over a surface from point to point. In another form, the pet carrier has an access opening which may alternatively be used as a storage area or may be placed in communication with the interior of the housing whereby a smaller animal, such as a cat, may be moved into and out of the carrier through said access opening. A carry handle is attached to the upper portion of the body to permit transport of the carrier.

2. Description of the Prior Art

Pet carriers are often utilized as kennels for animals, but more often are used to transport animals from point to point in automobiles or other vehicles such as planes and trains.

Heretofore pet carriers have been bulky and boxy in their construction and configuration and have been heavy with no ready means for enhancing the movement of the pet carrier from point to point.

Pet carriers have also been cumbersome to handle due to their box-like configuration and have also been of a size not readily adaptable for transportation by airplane for instance where the pet carrier would have to fit in the cargo hold or, more desirably for the pet owner, beneath the owner's seat, to the extent permitted by the airlines.

Ventilation is also an important feature of an acceptable pet carrier and many of those known have had limited ventilation means which is discomforting to the animal who is, in any event, housed within a relatively small space.

SUMMARY OF THE INVENTION

It is the primary object of this invention to provide a pet carrier which may be readily molded from a suitable plastic material, the molds creating the components of a body, which body ultimately defines a housing for the pet. The body when completely assembled into the finished pet carrier, includes an upper portion and a lower portion which are attached together to define the body and therefore the housing.

Each portion is provided with a segmented trackway circumscribing the free edge thereof when the portions are separated, the trackways mating as the two portions are combined together into the finished housing.

The housing constituting the pet carrier in its completed condition presents a line of attachment where the two trackways are mated which is inclined upwardly from the front of the body to the rear of the body, thus presenting a pleasing aesthetic appearance.

A door is provided in the front of the housing, in the upper portion of the body, which is slidable with respect to the upper portion of the body so that the door is within the housing when in an open position; thereby retaining the compact nature of the pet carrier even though the door is open.

In one embodiment a recess is provided in the upper portion of the body which recess may alternatively serve as a storage area which is provided with an imperforate swingable cover; or the recess may be in communication with the interior of the housing and provided with a swingable closure grille to permit the movement of a pet into and out of the housing through the recess.

The pet carrier is lightweight and may be readily moved over a surface by virtue of a pulling handle which is swingably attached to the upper portion of the body or, in the alternative, may be carried by means of a carrying handle which is attached to the upper portion of the body such as, for instance, to the swingable grille.

Locking latches are provided for the door in the front of the housing and also for the grille in the upper portion of the housing, if such is provided.

To accommodate the carrier within an automobile an outwardly extending flap is presented on the upper portion of the body for engagement with the conventionally provided automobile seatbelt whereby the pet carrier may be securely strapped to the seat of the automobile.

Other objects of the invention will become apparent from the following description and accompanying drawings wherein:

FIG. 1 is a front perspective view of a pet carrier constructed pursuant to one embodiment of the invention;

FIG. 2 is a rear perspective view of the pet carrier shown in FIG. 1 with the pulling handle folded down rather than swung upwardly as in FIG. 1;

Figure 7:
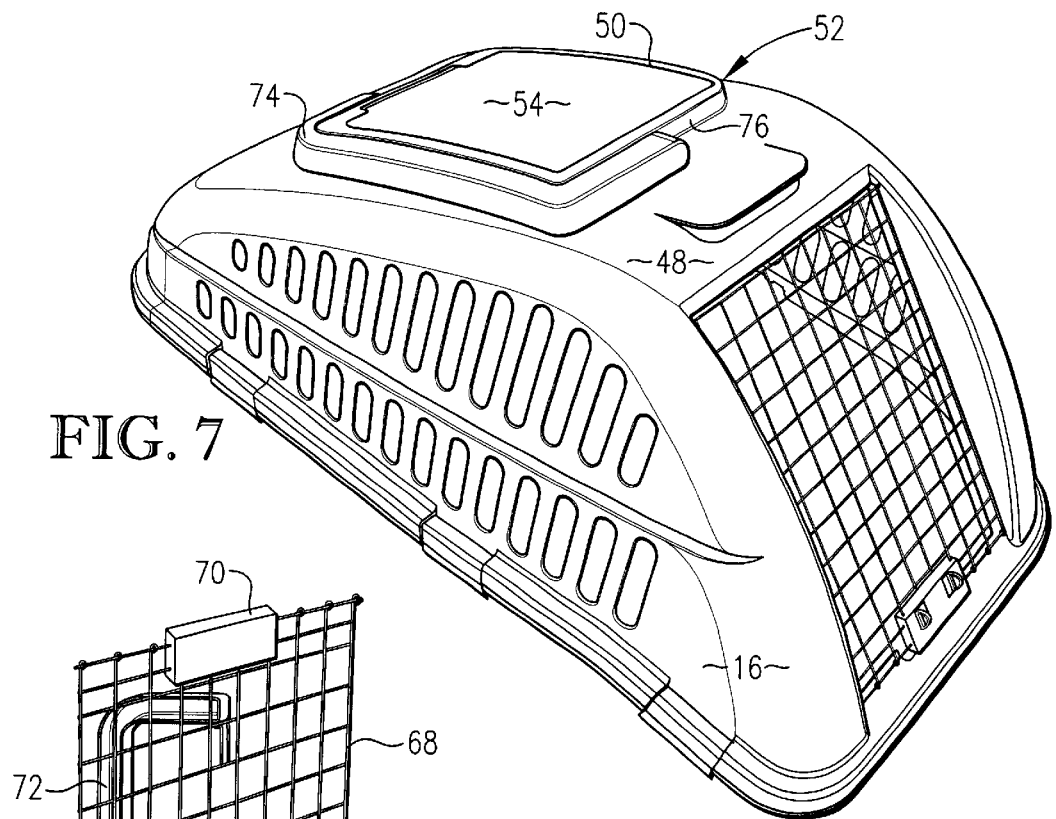
Figure 8:
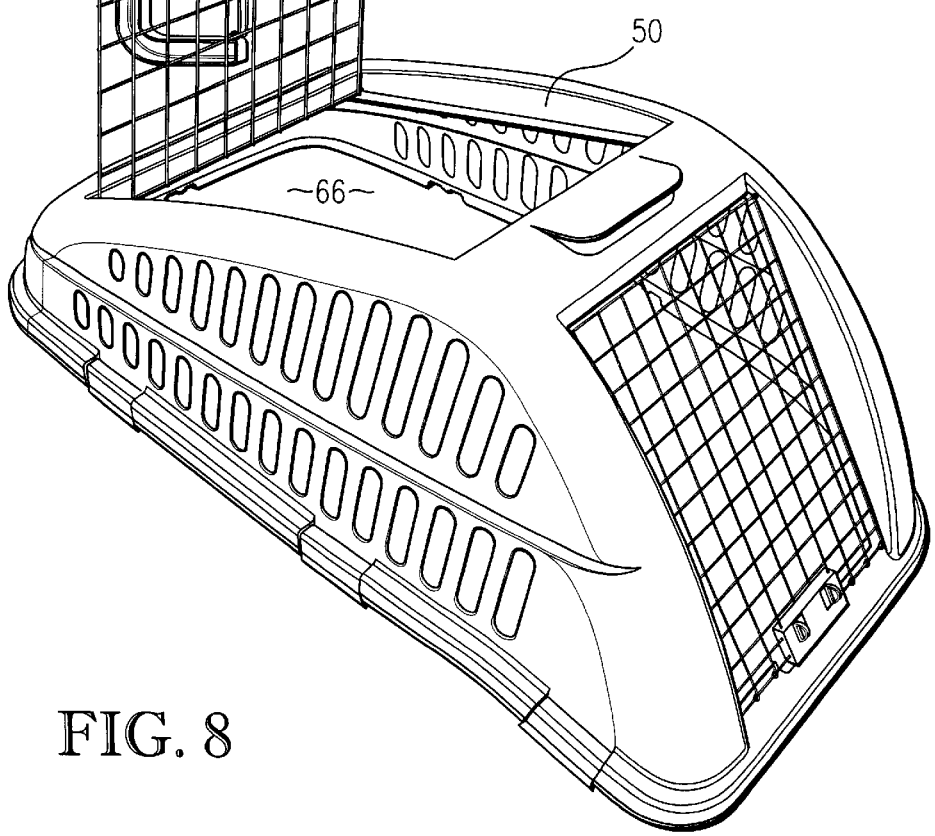

FIG. 7 is a perspective view of the upper portion of the body of the pet carrier illustrating a further embodiment wherein the recess in the upper portion of the body serves as a storage area having a cover and a carrying handle and seat belt flap are provided; and FIG. 8 is a view similar to FIG. 7 but showing a further embodiment of the invention wherein the recess in the top of the upper portion of the body serves as an access opening in communication with the interior of the housing and is provided with a swingable closure grille having a carrying handle attached thereto.

DETAILED DESCRIPTION OF THE PREFERRED EMBODIMENT

The pet carrier in its preferred embodiment, as shown in FIGS. 1–6 is broadly designated by the numeral 10 and has, as its primary components, a body 12 which defines a housing 14, the housing 14 including a normally upper portion 16 and a normally lower portion 18 which are attached together along a line of attachment 20 which, as illustrated in FIGS. 1 and 2 for instance, is inclined upwardly from the front of the body 22 to the rear 24 of the body.

The front wall 26 of the upper portion 16 is provided with an opening which is regulated by a door 28. The door 28 is secured in its closed condition, as illustrated in FIG. 1, by latch 30 which is engageable with the lower edge 32 of the front wall 26 whereby to tightly close the door to prohibit escape by the pet once placed within the housing 14.

Figure 6:
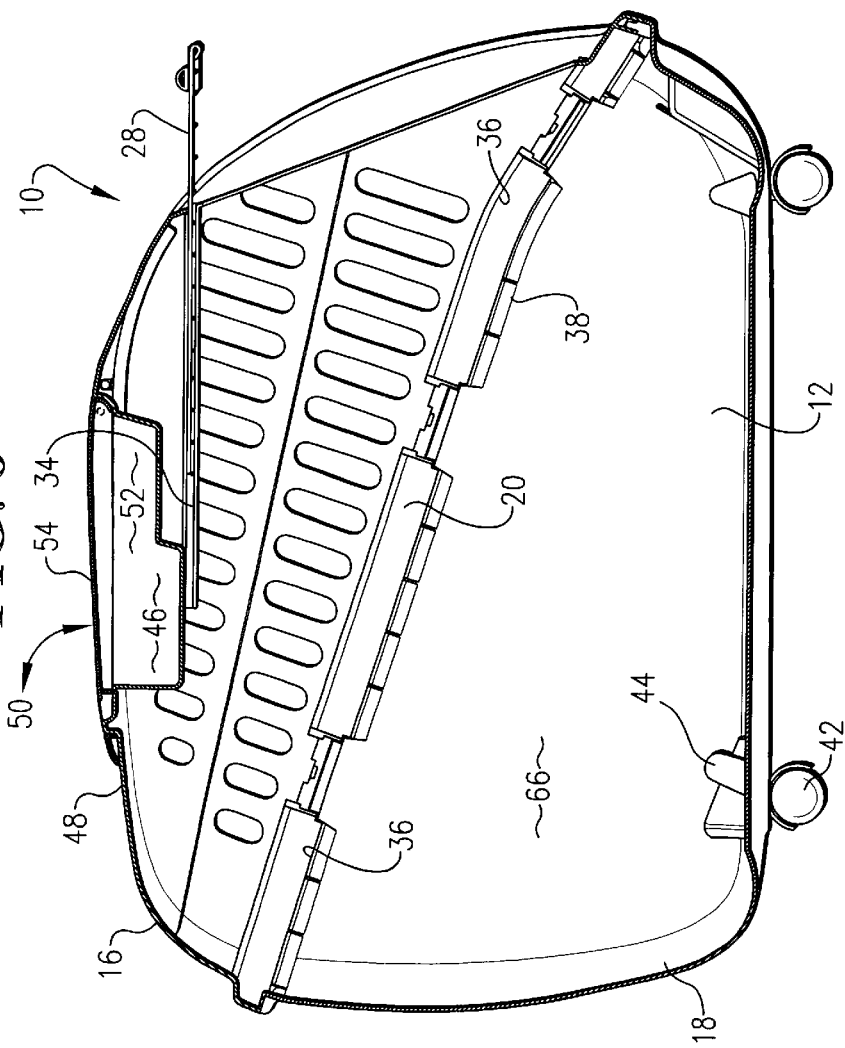
FIG. 6 is a longitudinal central sectional view showing the pet carrier with the front door in a raised condition.

As illustrated in FIG. 6, the front door 28 may be opened by releasing the latch 30; swinging the door upwardly to a generally horizontal position and then sliding the door 28 rearwardly along a pair of opposed rails 34. This permits the door to be retracted to within the housing so that if the carrier is used as a kennel, for instance, the door will be up and out of the way and will not impede the movement of the pet through the opening in the front wall which is regulated by front door 28.

The upper portion 16 of the body 12 is provided with a segmentally circumscribing trackway 36 which extends completely around the free edge of the upper portion 16 before it is attached to the lower portion 18.

To permit such attachment the lower portion 18 is provided with a complimentary segmentally circumscribing trackway 38 which, before the upper and lower portions are attached together, extends along the free edge of the lower portion.

The trackways 36, 38 are configured in such a manner that engaging portions thereof may be snapped together to thereby attach the upper portion and the lower portion and complete the assembly of the body 12 which defines the housing for the pet. Suitable locking tabs 40 are provided for fitting over the attached trackways 36, 38 whereby to tightly secure the same in place and thus firmly attach the upper and lower portion in such a manner they may not be readily separated in use.

The lower portion 18 of the body 12 is provided with a set of wheels 42 there being a wheel or caster wheel attached to the lower face of the portion 18 at basically each corner thereof as illustrated, for instance, in FIGS. 1, 2 and 6 of the drawings. The wheels 42 are received within complimentary sockets 44 which are molded into the lower portion 18 of the body 12 when it is originally created.

An opening or recess 46 is provided in the top wall 48 of the upper portion 16 as at 50, the recess being in the form of an indentation into the top wall 48 of the upper portion 16 whereby, in the form illustrated in FIGS. 1–6, a storage area such as 52 is created. The storage area 52 is covered by a swingable imperforate cover 54.

In order to permit movement of the pet carrier 10 as illustrated in FIGS. 1–6 over a surface by the user thereof, a pulling handle 56 is provided and is swingably attached to the top wall 48 of the upper portion 16 of the body 12. In FIG. 1 the pulling handle is shown as swung to a position of use whereby the user may pull the pet carrier with the pulling movement being assisted by the wheels 42 on the lower portion of the housing 14 which obviously facilitate movement of the carrier 10 over a surface. This construction would be particularly useful in moving the pet carrier through an airport, for instance, in that the user could pull the carrier rather than have to lift and carry the pet carrier.

To provide suitable ventilation for the pet who is received within the housing 14, there is provided, in addition to the front door 28 which is preferably formed of a wire screen material, a plurality of vent holes 58 in the side walls 60 of the upper portion 16. It is also desirable to provide vent holes 62 in the rear wall 64 of the upper portion of the body 12.

If desired, feeding bowls for the pet may be positioned within the interior space 66 which is defined by the housing 14. The bowls may be fabricated to snap into place and therefore be firmly positioned in the interior to prevent dislodgment by the pet and yet provide a sturdy receptacle for food or water for the pet who is confined within the housing 14 of the pet carrier 10.

It will be appreciated that the upper portion 16 and the lower portion 18 may be molded and then packaged in a nested condition so that assembly by the user is required. This would be accomplished by placing the upper portion 16 over the lower portion 18 so that their respective trackways 36, 38 are attached together and then utilizing locking tabs 40 to affirmatively attach the upper portion 16 to the lower portion 18. The front door 28 may be then inserted if necessary and the wheels 42 may be placed in their corresponding sockets 44 to complete assembly of the pet carrier.

The upper portion 16 as illustrated in FIG. 7 has a recess in the top wall 48 of the upper portion 16, as previously described, in the form of a storage compartment where accessories may be kept and which storage compartment 52 may be tightly closed and secured by the cover 54.

The upper portion 16 as illustrated in FIG. 8 is particularly adapted to receive a smaller animal such as a cat. To this end, the recess 50 is in communication with the interior space 66 of the housing 14 to permit placement of the cat and removal of the cat through the recess 50. The recess 50 is covered by a swingable closure grille 68 which, as illustrated in FIG. 8, may be swung upwardly with respect to the housing to permit insertion of the cat into the housing and then swung downwardly to a closed locked condition wherein a retainer 70 in the form of a lock or latch securely closes the grille 68.

Such secure closing is necessary since the grille 68 is provided with a carrying handle 72 whereby when the grille is closed and locked the entire pet carrier may be lifted and readily carried by the user thereof.

In all embodiments the upper portion 16 of the body 12 is generally defined as a concavity by the walls thereof to present a domed configuration for the assembled pet carrier 12. The lower portion 18 is, as illustrated, of a complimentary concave configuration whereby, when the upper portion and lower portion are joined together a generally rectangular pet carrier is presented with rounded corners, all of which contributes to the aesthetic appearance of the pet carrier 10 when assembled and therefore its desirability for use by pet owners.

Figure 3:
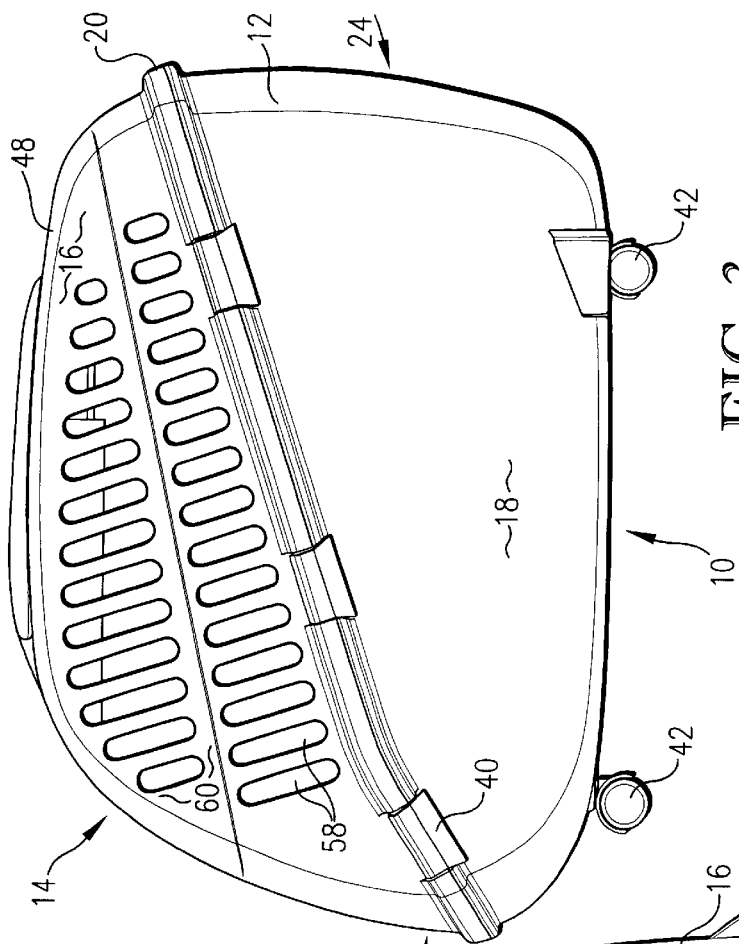
FIG. 3 is a side elevational view of the carrier illustrated in FIGS. 1 and 2.
Figure 4:
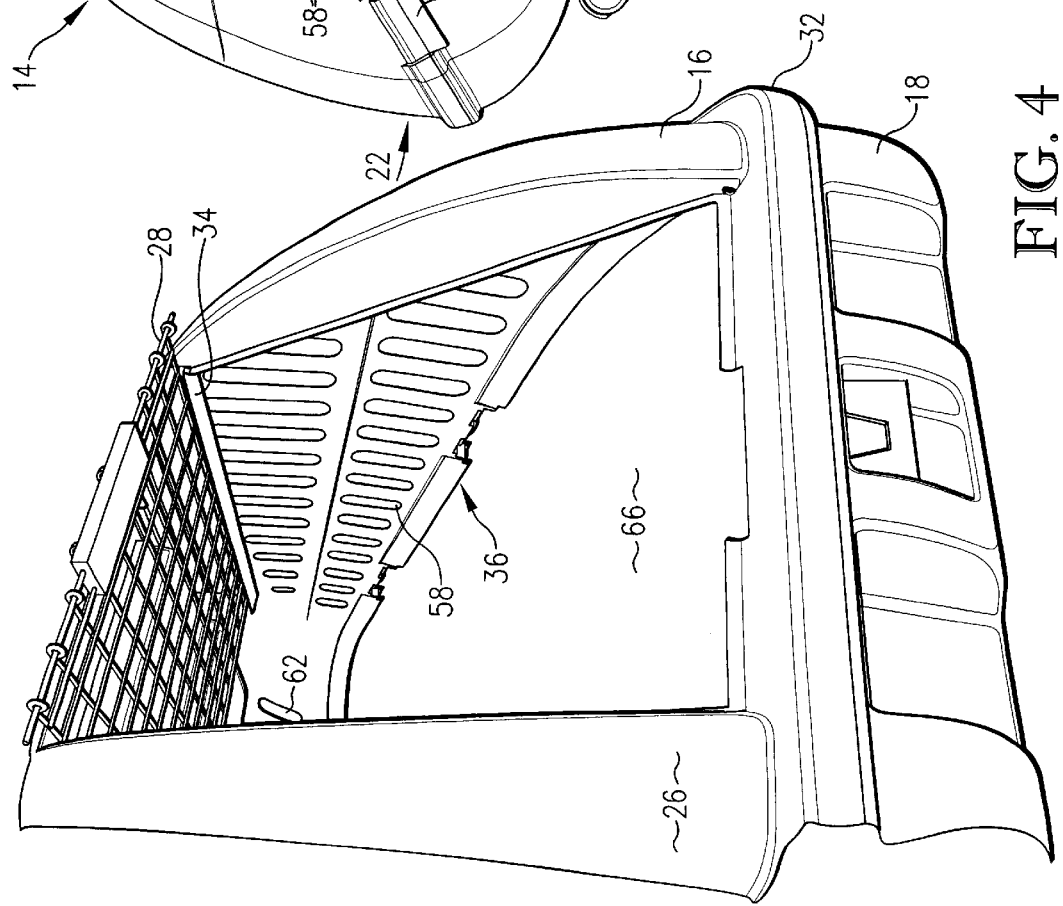
FIG. 4 is an enlarged fragmentary front perspective view of the pet carrier with the front door open and showing the interior of the housing.
Figure 5:
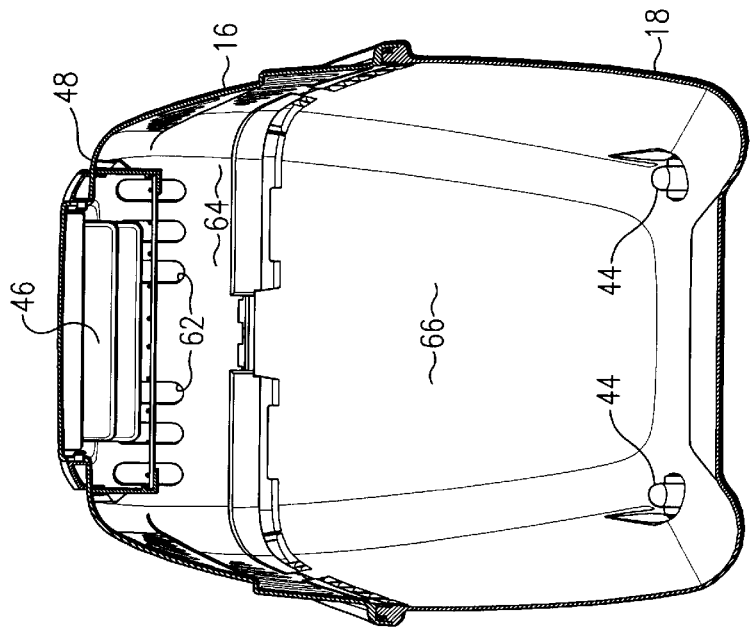
FIG. 5 is a transverse sectional view taken substantially centrally of the pet carrier as shown in FIGS. 1–4.

Access to the interior space 66 of the housing 14 in the case of the larger pet carrier 10 as illustrated in FIGS. 1–6 is readily accomplished by moving the front door 28 upwardly from the closed condition as illustrated in FIG. 1 to the open condition as illustrated in FIGS. 4 and 6 whereby a pet may be readily and easily introduced into the carrier 10.

Once the pet is in place, the front door 28 is pulled forwardly and swung downwardly and tightly latched by means of latch 30 securely engaging the lower edge 32 of the front wall 26 of the upper portion 16.

In the embodiment illustrated in FIG. 8, a smaller animal may be readily introduced to the interior space 66 of the pet carrier 10 through the recess 50 by lifting the closure grille 68 to the position shown in FIG. 8 introducing the small animal into the housing 14 and then closing the grille 68 and securely retaining the same by means of lock or latch 70. The pet carrier 10 then may be readily transported through utilization of the carrying handle 72.

On the other hand, and as shown in FIGS. 1 and 7, for instance, the recess 50 may be utilized as a storage compartment with a cover 54 and not as an access into the interior space 66 of the housing 14. With a smaller carrier a carrying handle 74, as shown in FIG. 7, may be attached to the wall 76 defining the recess 50 with the handle being swung to a vertical position (not shown) to permit carrying of the pet carrier by the user thereof. Yet further, as shown in FIG. 4, an opening 78 may be provided for attachment of a leash (not shown) to permit pulling of any of the carriers illustrated by utilizing the leash and the wheels such as 42.

Thus, within the basic concept described there may be various embodiments which are usable depending upon the nature of the pet to be housed and carried, the particular size being complimentary to the size of the pet to be received within the carrier.

We claim:

1. A pet carrier comprising:

a body defining a housing for the pet, the body including a normally upper portion and a normally lower portion, the portions being attached together along a line of attachment to define the housing;

the line of attachment of the portions being inclined upwardly from the front of the body to the rear of the body, there being a trackway segmentally circumscribing the upper portion of the body and a complimentary trackway circumscribing the lower portion of the body, the trackways mating to attach the portions together.

2. A pet carrier as set forth in claim 1, there being wheels on the lower portion of the body.

3. A pet carrier as set forth in claim 2, there being a pulling handle swingably attached to the upper portion of the body to permit pulling of the pet carrier along a supporting surface through use of the wheels and the pulling handle.

4. A pet carrier as set forth in claim 1, there being a door in the front of the housing, the door being in the upper portion of the body.

5. A pet carrier as set forth in claim 4, there being a recess in the top of the upper portion of the body to serve as a storage area or as an access opening.

6. A pet carrier as set forth in claim 5, there being a generally concave wall defining said upper portion of the body.

7. A pet carrier as set forth in claim 6, there being a generally concave wall defining the lower portion of the body.

8. A pet carrier as set forth in claim 7, there being a plurality of vent holes in the wall defining the upper portion of the body.

9. A pet carrier as set forth in claim 5, there being a swingable closure grille over said recess when it serves as an access opening in the top of the upper portion, the recess being in communication with the interior of the housing whereby a pet may be moved into and out of the housing through said recess.

10. A pet carrier as set forth in claim 9, there being a retainer for maintaining the closure grille in a closed position with respect to the recess when serving as an access opening whereby the pet may not escape from the carrier after being moved thereinto through the access opening.

11. A pet carrier as set forth in claim 5, there being a swingable, imperforate cover for the recess when it serves as a storage area.

12. A pet carrier as set forth in claim 9, there being a carrying handle attached to the swingable closure grille to permit manual carrying of the pet carrier.

13. A pet carrier as set forth in claim 4, the front door being slidable with respect to the upper portion of the body so that the door is within the housing when in an open position.

14. A pet carrier as set forth in claim 13, there being a latch for retaining the front door in a closed condition with respect to the housing.

15. A pet carrier as set forth in claim 1, there being locking tabs engageable with the mated trackways to retain the portions in the attached relationship achieved by the mating segments of the trackways.

16. A pet carrier as set forth in claim 1, there being a flap extending from the upper portion of the body and for engagement with a vehicle seat belt to permit the pet carrier to be secured within a vehicle.

\* \* \* \* \*